3,389,012
TEFLON COATING ON EDGES OF
CONTACT LENS
Homer A. Hamm, Westchester, Ill., assignor to The Plastic Contact Lens Company, Chicago, Ill., a corporation of Illinois
No Drawing. Filed July 15, 1965, Ser. No. 472,327
4 Claims. (Cl. 117—33)

This invention relates to a novel contact lens construction and to methods for producing such a lens. The invention is particularly concerned with procedures for treatment and modification of contact lenses whereby the characteristics of the lenses from the standpoint of comfort to the wearer can be significantly improved.

The use of contact lenses is quite extensive since many people prefer such lenses to eye glasses. Contact lenses have certain advantages over eye glasses from the standpoint of appearance and also with regard to proper eye care.

Most individuals who attempt to wear contact lenses become accustomed to the lenses after an initial period. The time necessary for an individual to become accustomed to the lenses varies considerably, however, and in virtually every case, there is an initial period of discomfort. Thus, each lens constitutes a foreign object which is positioned in the eye, and the individual initially will tend to experience irritation due to the pressence of a lens. Excessive blinking usually results along with an accelerated tear flow.

In the usual lens design, the interior surface of the lens which is located against the surface of the eye defines a concave shape. The lens comprises a centrally located optical portion and edge portions surrounding the optical portion. The concavity is such that the edge portions fit against the surface of the eye for contact therewith while the central portions are spaced from the eye surface. A tear layer actually exists between the lens and the eye surface, and it will be understood that in referring to contact of the lens with the eye, the presence of this tear layer is recognized.

Since the edge portions of the lens contact the eye, it is understandable that the characteristics of the edge portions have a definite bearing on the wearing comfort of the lens. In the manufacture of a lens, procedures are undertaken which provide for rounding of the edge portions whereby the smoothest possible surface will be presented. These techniques substantially reduce irritation; however, discomfort is still prevalent.

It is an object of this invention to provide an improved contact lens which is characterized by modified edge portions whereby the lens can be used with minimum discomfort.

It is a further object of this invention to provide improved techniques for the manufacture of a contact lens whereby individuals can use contact lenses with minimum discomfort.

These and other objects of this invention will appear hereinafter, and it will be understood that the specific examples of the invention included herein are provided solely for purposes of illustration and not by way of limitation.

The contact lens of this invention is characterized by a modified edge portion surounding the centrally located optical portion. The modification of the lens comprises a coating formed on the interior surface of the lens in the edge portion thereof whereby a coated surface will be disposed against the eye of the wearer. The coating of this invention comprises a tetrafluoroethylene polymer. Specifically, the coating comprises a Teflon coating.

In the production of the coating, various methods can be employed; however, it is preferred that the coating be polymerized on the surface of the lens. By employing various techniques which are available, an excellent coating, having a high degree of uniformity and free of pinholes, can be produced.

The contact lenses having the Teflon coated edge portions have been found to be extremely satisfactory when worn. The presence of the Teflon apparently provides a surface which is extremely compatible with the surface of the eye. It has been found that a wearer of the lenses substantially loses the feeling that a foreign object is present in the eye. The comfort experienced in the use of lenses having the Teflon coated edges is extremely important from the standpoint of individuals attempting to wear contact lenses for the first time. This initial wearing of the lenses represents an extremely difficult stage, and any reduction in discomfort is highly important. Where wearing of the lenses is facilitated in the early stages, individuals are much more likely to become accustomed to continued use of the lenses. A reduction in irritation is also of great important from the standpoint of enjoyment of the lenses even after prolonged use.

In the formation of the Teflon coating on a lens, various procedures can be employed. One such procedure comprises a glow discharge technique wherein the lens is mounted to comprise an electrode. An electrical field is set up about the lens, and a gaseous monomer capable of polymerizing to form the tetrafluoroethylene polymer is formed adjacent the lens surface. The electric field results in a glow discharge to the surface whereby a polymerized film or coating is formed on the surface. Reference is made to Goodman Patent No. 2,932,591 for teachings of the procedures followed in producing coatings of the type referred to. Coleman Patent Nos. 3,068,510 and 3,069,283 also provide pertinent disclosures from the standpoint of procedural techniques.

Other techniques contemplated for use in practicing the instant invention comprise a magnetically contained glow discharge system, electron beam induced polymerization, and ultraviolet irradiation. These techniques along with the glow discharge technique discussed above are described in the February 1964, issue of "Plastics Technology," pages 9, 10 and 11. It will be appreciated that the instant invention contemplates any suitable method capable of achieving a Teflon coating on the edge portion of a contact lens. It will also be appreciated that this invention contemplates confining of the coating to the edge portions whereby the optical characteristics of the lens will not be disrupted. The extent of the coating beyond the edge portions is, however, contemplated where such optical considerations are not a problem.

In a typical procedure for producing a lens in accordance with this invention, the lens is mounted in a chamber which can be evacuated in accordance with glow discharge procedures. A mask is located on the lens to cover areas which are not to be coated. A holder for the lens is interconnected with this mask to support the lens in a desired position. It is preferred that a material such as an electrically conductive rubber be employed for the mask and holder whereby the electrode characteristics of the lens can be readily achieved.

A monomer gas pressure of about 1 mm. has advantageously been used. An electric field of 300 volts is employed in such a system. A Teflon coating 2 microns thick is formed after treatment for 10 to 15 minutes. By varying the monomer gas pressure, the electric field and the treating times, various thicknesses of Teflon can be employed. It is preferred that the thickness be maintained within a range of up to about 15 microns. The conditions of treatment can vary considerably; however, prior art procedures provide for control in the system whereby uniform and pinhole free coatings can be consistently produced.

In referring to coatings, it will be appreciated that any surface treatment which results in the presence of Teflon or its equivalent on the lens surface is contemplated. A uniform and substantially pinhole free film or coating is preferred although more selective applications of the material are contemplated.

It will be understood that various changes and modifications may be made in the lenses and procedures described which provide the characteristics of this invention without departing from the spirit thereof particularly as defined in the following claims.

That which is claimed is:

1. In a process for the manufacture of a contact lens which comprises a centrally located optical portion and a surrounding edge portion, the improvement comprising forming a coating on the interior surface of the lens to cover at least said edge portion whereby the coated surface of the lens will be disposed against the eye of the wearer, said coating comprising a tetrafluoroethylene polymer.

2. A process in accordance with claim 1 wherein said coating is applied by providing a monomer adapted to polymerize to form tetrafluoroethylene, subjecting gaseous quantities of the monomer to glow discharge, said lens being connected as an electrode in said discharge system whereby the monomer is attracted to said lens and a polymerized coating is formed thereon.

3. A process in accordance with claim 2 including the steps of applying a mask on said interior surface of the lens to cover said centrally located optical portion, said mask being electrically conductive to provide an electrode for the system.

4. In a contact lens comprising a centrally located optical portion and a surrounding edge portion, the improvement comprising a coating on said edge portion of the lens, said coating comprising a tetrafluoroethylene polymer, and said coating being formed on the interior surface of the lens for disposition against the eye of the wearer of the lens.

References Cited

UNITED STATES PATENTS

| 3,069,283 | 12/1962 | Coleman | 117—93.31 X |
| 3,068,510 | 11/1962 | Coleman | 117—93.31 X |
| 2,932,591 | 3/1960 | Goodman | 117—93.31 X |

RALPH S. KENDALL, *Primary Examiner.*

A. GRIMALDI, *Assistant Examiner.*